US008689120B2

(12) United States Patent
McGreevy et al.

(10) Patent No.: US 8,689,120 B2
(45) Date of Patent: Apr. 1, 2014

(54) VISUALIZATION PROFILES AND TEMPLATES FOR AUTO-CONFIGURATION OF INDUSTRIAL AUTOMATION SYSTEMS

(71) Applicant: Rockwell Automation Technologies, Inc., Mayfield Heights, OH (US)

(72) Inventors: Robert Joseph McGreevy, Oswego, IL (US); Michael John Pantaleano, Willoughby, OH (US); Bruce Gordon Fuller, Edmonton (CA); Ian Edward Tooke, Barrie (CA); Kevin John Albert, Wauwatosa, WI (US); John Joseph Baier, Mentor, OH (US); Jan Pingel, New Berlin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 13/908,127

(22) Filed: Jun. 3, 2013

(65) Prior Publication Data

US 2013/0265315 A1  Oct. 10, 2013

Related U.S. Application Data

(63) Continuation of application No. 12/193,948, filed on Aug. 19, 2008, now Pat. No. 8,473,854.

(51) Int. Cl.
*G06F 3/00* (2006.01)
(52) U.S. Cl.
USPC .......................................................... 715/762
(58) Field of Classification Search
USPC .......................................................... 715/762
See application file for complete search history.

(56) References Cited

U.S. PATENT DOCUMENTS

| | | | | |
|---|---|---|---|---|
| 5,463,567 A | * | 10/1995 | Boen et al. ..................... | 702/187 |
| 5,646,866 A | * | 7/1997 | Coelho et al. ................. | 715/716 |
| 5,872,926 A | * | 2/1999 | Levac et al. ................... | 709/206 |
| 6,034,970 A | * | 3/2000 | Levac et al. ................... | 370/466 |
| 6,108,662 A | | 8/2000 | Hoskins et al. | |
| 6,151,567 A | * | 11/2000 | Ames et al. ..................... | 703/13 |
| 6,826,518 B1 | | 11/2004 | Ivezic et al. | |
| 6,834,388 B1 | * | 12/2004 | Elsbree ......................... | 719/316 |
| 7,356,773 B1 | | 4/2008 | Barraclough | |
| 7,620,907 B2 | | 11/2009 | Resnick et al. | |
| 7,890,927 B2 | | 2/2011 | Eldridge et al. | |
| 8,473,854 B2 | * | 6/2013 | McGreevy et al. ........... | 715/762 |
| 2002/0199123 A1 | | 12/2002 | McIntyre et al. | |
| 2003/0069650 A1 | | 4/2003 | Karmiy et al. | |
| 2003/0182083 A1 | | 9/2003 | Schwenke et al. | |
| 2004/0059583 A1 | * | 3/2004 | O'Neill ............................ | 705/1 |
| 2004/0073404 A1 | | 4/2004 | Brooks et al. | |
| 2005/0258260 A1 | | 11/2005 | Ahmed | |

(Continued)

OTHER PUBLICATIONS

Office Action dated Jun. 24, 2011 for U.S. Appl. No. 12/193,948, 20 pages.

(Continued)

*Primary Examiner* — Enrique Iturralde
(74) *Attorney, Agent, or Firm* — Amin, Turocy & Watson, LLP

(57) ABSTRACT

A visualization system utilizing pre-configured visualization profiles and templates to reduce the level of effort and time required to commission an industrial automation visualization system. The preconfigured visualization profiles and templates include graphic displays, informational reports and data sampling and collection strategies appropriate for the specific sector of manufacturing or industry.

20 Claims, 10 Drawing Sheets

(56) References Cited

U.S. PATENT DOCUMENTS

| | | |
|---|---|---|
| 2006/0082010 A1 | 4/2006 | Saggese et al. |
| 2006/0206866 A1 | 9/2006 | Eldrige et al. |
| 2007/0112574 A1 | 5/2007 | Greene |
| 2007/0150489 A1* | 6/2007 | Dettinger et al. ............ 707/100 |
| 2007/0299907 A1 | 12/2007 | Deininger et al. |
| 2008/0082194 A1 | 4/2008 | Samardzija et al. |
| 2008/0125877 A1* | 5/2008 | Miller et al. ................... 700/29 |

OTHER PUBLICATIONS

Office Action dated Jan. 9, 2012 for U.S. Appl. No. 12/193,948, 22 pages.

Office Action dated Oct. 26, 2012 for U.S. Appl. No. 12/193,948, 23 pages.

* cited by examiner

VISUALIZATION PROFILES AND TEMPLATES FOR AUTO-CONFIGURATION OF INDUSTRIAL AUTOMATION SYSTEMS

CROSS-REFERENCE TO RELATED APPLICATIONS

This application is a continuation of U.S. patent application Ser. No. 12/193,948, filed on Aug. 19, 2008, and entitled "VISUALIZATION PROFILES AND TEMPLATES FOR AUTO-CONFIGURATION OF INDUSTRIAL AUTOMATION SYSTEMS," the entirety of which is incorporated herein by reference.

TECHNICAL FIELD

The subject invention relates generally to industrial control systems, and more particularly to visualization systems that interact with industrial control systems based in part on providing predefined configurations relating to industry or operation.

BACKGROUND

Industrial controllers are special-purpose computers utilized for controlling industrial processes, manufacturing equipment, and other factory automation, such as data collection or networked systems. One type of industrial controller at the core of an industrial control system is a logic processor such as a programmable logic controller (PLC) or personal computer (PC) based controller. Programmable logic controllers for instance, are programmed by systems designers to operate manufacturing processes via user-designed logic programs or user programs. The user programs are stored in memory and generally executed by the PLC in a sequential manner although instruction jumping, looping and interrupt routines, for example, are also common. Associated with the user program are a plurality of memory elements or variables that provide dynamics to PLC operations and programs.

Connected to the PLC are input/output (I/O) devices. I/O devices provide connection to the PLC for both automated data collection devices such as limit switches, photoeyes, load cells, thermocouples, etc. and manual data collection devices such as keypads, keyboards, pushbuttons, etc. Differences in PLCs are typically dependent on number of I/O they can process, amount of memory, number and type instructions and speed of the PLC central processing unit (CPU).

Another type of industrial controller at the core of an industrial control system is the process controller of a distributed control system (DCS). The process controller is typically programmed by a control engineer for continuous process control such as an oil refinery or a bulk chemical manufacturing plant. A control engineer typically configures control elements such as proportional-integral-derivative (PID) control loops to continuously sample the I/O data, known as the process variable, from the process, compare the process variable to a configured set point and output an error signal, proportional to the difference between the set point and the process variable, to the control device. The control device then adjusts the element controlling the process property, such as a valve in a pipe for flow control or a heating element in a distillation column for temperature control, in an attempt to minimize the error signal. As the DCS name implies, many process controllers are distributed around the process and are communicatively coupled to each other forming the overall control system.

Connected to the process controller are similar types of I/O devices as connected to the PLC and additionally, intelligent I/O devices more common to the process control industry. These intelligent devices have embedded processors capable of performing further calculations or linearization of the I/O data before transmission to the process controller.

A visualization system is generally connected to the industrial controller to provide a human-friendly view into the process instrumented for monitoring or control. The user of a visualization system configures one or more graphical displays representing some aspect of the process the industrial controller is controlling or monitoring. The graphical displays each contain a user configured number of data values collected from the I/O connected to the industrial controller and considered by the user as relevant to the particular graphical display or process area of interest. Other data points may be configured strictly for archival purposes or to generate reports related to interests such as production, downtime, operator efficiency, raw material usage, etc.

Users of the visualization system are often required to design and configure all aspects of the system for their particular use. This includes defining tags to represent data values obtained from the I/O and determining frequencies with which to sample the data values from the control network and associated devices. Additionally, the frequency at which the data should be archived for report generation, historical review and graphical update often need to be specified. The design of the graphical image should be created and arranged in a coherent system to represent the applicable process. Informational reports should be created for each aspect of the process and a schedule specified for when to generate and disseminate the report. This includes applicable data for inclusion in the report and the layout of the report for output.

While each visualization system user desires to keep a competitive advantage by protecting their efforts and reasoning put forth in configuring a visualization system, market pressure has increased for an easier path to the configuration and start-up of an industrial automation visualization system. Additionally, although many industries are different with regard to the product produced, the market available for the product or their geographical location, when viewed from above they tend to use similar operations at the industrial production level. These issues induced a market wide problem of low efficiency in the ability to create and start-up an industrial automation visualization system because of the redundancy of effort associated with the commissioning of each industrial automation visualization system.

SUMMARY

The following presents a simplified summary in order to provide a basic understanding of some aspects described herein. This summary is neither an extensive overview nor is intended to identify key/critical elements or to delineate the scope of the various aspects described herein. Its sole purpose is to present some concepts in a simplified form as a prelude to the more detailed description presented later.

A visualization system utilizing pre-configured profiles and templates to reduce level of effort and time required to commission an industrial automation visualization system. The pre-configured profiles available for selection includes configuration items such as pre-defined tags, tag data sample rates, tag data logging rates, graphical update rates, derived tags for calculations of useful information such as statistical values, schedules of frequencies to generate and deliver reports, tag data events defined to initiate reports, alarm event conditions, alarm notification conditions, schedule of frequencies to download recipes for product changeover, tag data events for downloading recipes for product changeover, etc. The pre-configured templates available for selection include overview graphics, detail graphics, production line graphics, machine operation specific graphics, graphic page changing conditions based on tag data change events, graphic page changing conditions based on time of day or running time value, alarm display messages, etc. The user can select entire process operations, or select individual machine configurations to build the basic visualization system used to create the final industrial automation visualization system.

Systems and methods are provided to allow the visualization system user to select maximum amount of pre-configured information and graphical representations to reduce time, effort and learning curve required of the user in commissioning a functioning industrial automation visualization system. In this regard, the user can eliminate redundant effort in creating an industrial automation visualization system and add the newly created system to the pre-configured profiles and templates to further reduce commissioning time for future visualization systems. In this manner, the combination of these aspects allows reduction in time and effort required to create and commission an industrial automation visualization system therefore addressing the market need of eliminating redundant effort and time required in becoming proficient with the industrial automation visualization system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
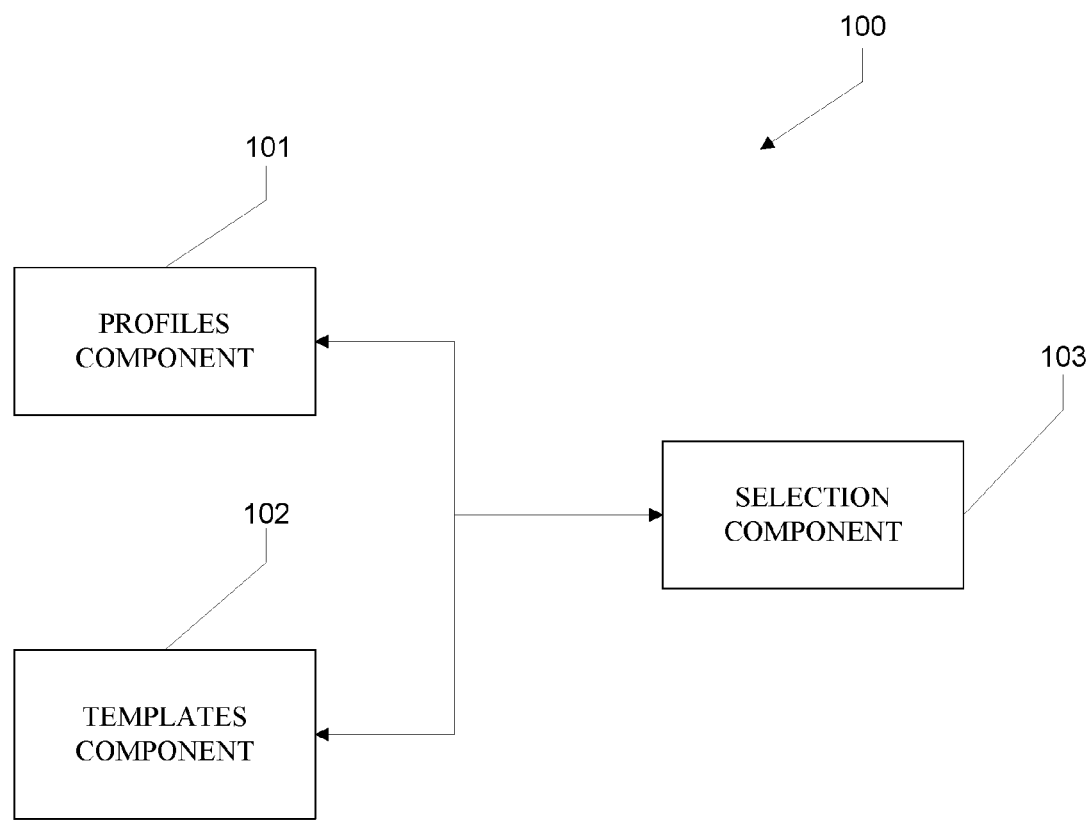
FIG. 1 illustrates predefined profiles and templates components and their associated selection component.

Systems and methods are provided enabling the use of preconfigured profiles and/or templates as a starting point for the creation of an industrial automation visualization system. The user may select preconfigured profiles and templates by industry type, machine type, industrial unit operation type, production line type or any other provided grouping. The user may also combine selections of sections of the above referenced types into a new user defined type. The preconfigured types contain default configurations with respect to parameters and graphical images associated with the selected type but the user may modify any default settings appropriate to the user's requirements.

In one aspect of the subject disclosure, the preconfigured profiles and templates represent a configured system associated with the selected grouping. The user may map the process data in the I/O device to match the default configuration of the preconfigured industrial automation visualization system and commission the system for use. In another and more common aspect, the user can select profiles and templates to most closely match the user's industrial process and modify the default configuration to create a custom industrial automation visualization system. The customized industrial automation visualization system can then be saved for future use as preconfigured profiles and templates and commissioned for use in monitoring, controlling and reporting on the industrial process of interest.

It is noted that as used in this application, terms such as "component," "display," "interface," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith. Additionally, it is noted that as used in this application, terms such as "system user," "user," "operator" and the like are intended to refer to the person operating the computer-related entity referenced above.

As used herein, the term to "infer" or "inference" refer generally to the process of reasoning about or inferring states of the system, environment, user, and/or intent from a set of observations as captured via events and/or data. Captured data and events can include user data, device data, environment data, data from sensors, sensor data, application data, implicit and explicit data, etc. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

It is also noted that the interfaces described herein can include a Graphical User Interface (GUI) to interact with the various components for providing industrial control information to users. This can include substantially any type of application that sends, retrieves, processes, and/or manipulates factory input data, receives, displays, formats, and/or communicates output data, and/or facilitates operation of the enterprise. For example, such interfaces can also be associated with an engine, editor tool or web browser although other type applications can be utilized. The GUI can include a display having one or more display objects (not shown) including such aspects as configurable icons, buttons, sliders, input boxes, selection options, menus, tabs and so forth having multiple configurable dimensions, shapes, colors, text, data and sounds to facilitate operations with the interfaces. In addition, the GUI can also include a plurality of other inputs or controls for adjusting and configuring one or more aspects. This can include receiving user commands from a mouse, keyboard, speech input, web site, remote web service and/or other device such as a camera or video input to affect or modify operations of the GUI.

Additionally, it is also noted that the term industrial controller as used herein includes both PLCs and process controllers from distributed control systems and can include functionality that can be shared across multiple components, systems, and or networks. One or more industrial controllers can communicate and cooperate with various network devices across a network. This can include substantially any type of control, communications module, computer, I/O device, Human Machine Interface (HMI)) that communicate via the network which includes control, automation, and/or public networks. The industrial controller can also communicate to and control various other devices such as Input/Output modules including Analog, Digital, Programmed/Intelligent I/O modules, other programmable controllers, communications modules, and the like. The network (not shown) can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Referring initially to FIG. 1, a visualization auto-configuration system 100 for selecting initial profiles and templates for an industrial automation system is depicted. It should be appreciated that the increase in complexity of industrial automation visualization systems has induced a corresponding increase in the knowledge, time and effort required to create and commission an industrial automation visualization system. Visualization auto-configuration system 100 addresses this inefficiency by providing profiles and templates allowing the user to select predefined strategies and graphics to use as a starting point in creating an industrial automation visualization system.

It is contemplated that visualization auto-configuration system 100 can form at least part of a human machine interface (HMI), but is not limited thereto. For example, the visualization auto-configuration system 100 can be employed to facilitate creating a visualization system related to automation control systems, devices, and/or associated equipment (collectively referred to herein as an automation device(s)) forming part of a production environment. Visualization auto-configuration system 100 includes profiles component 101, templates component 102 and selection component 103.

The profiles component 101 contains a database of predefined profile configurations associated with an industrial automation visualization system. The database is segregated for selection by differences such as but not limited to industry type, production line type, manufacturing process type, machine type and unit operation type. For example, a manufacturing process type such as continuous process may be available for user selection if the user intended to create a visualization system for an aspect of an oil refinery. Another example might include a production line type such as a bottling line for user selection if the user intended to create a visualization system for an aspect of a new soft drink manufacturing process.

Various aspects of the provided profiles may change depending on the type of profile selected and may provide recommendations or constraints on modifying the predefined configurations. For example, selecting an industry type such as the pharmaceutical industry may have similar configuration information as other industry types with respect to a parameter such as graphic update rate but significantly different configuration with respect to parameters such as data logging rate. The intelligence that the pharmaceutical industry has stringent requirements for data retention is included in the preconfigured profile. Further, certain parameters may require secured access to change because certain changes would violate known rules of the industry. An example, again referencing the pharmaceutical industry profile might include attempting to change a logging configuration parameter requiring data retention effectively forever. The profile has knowledge that this industry requires traceability based on government regulation and a change impacting this aspect of the profile requires successful presentation of appropriate security credentials before the modification is allowed.

The templates component 102 contains a database of predefined graphic images and reports associated with an industrial automation visualization system Like the profiles component 101 database, the templates component 102 database is segregated by differences such as but not limited to industry type, production line type, manufacturing process type, machine type and unit operation type. For example, a user can select a palletizer graphic from the machine type section of the templates component 102 database to add to an existing industrial automation visualization system because a new piece of automation equipment was added to the existing production line. In another example, this same user can select an equipment downtime report from the templates component 102 database to provide management with efficiency information on the new palletizer and return on investment data for the capital expenditure.

The user can also select an entire production line from the templates component database 102 and used in concert with a selection from the profiles component 101 database create an entirely new industrial automation visualization system with predefined components. For example, the user might select a "Canning Line" from the production line type of the templates component 102 database for a new soup product. Associated with the canning line selection, the user can also select a "Canning Line Production Report" for informing management of production information for the new operation. Additionally, a "Canning Line Recipe" may be selected for storing parameters specific to an individual product, soup in this case, so the canning line can quickly be converted from one product to another by downloading the recipe parameters to the associated industrial controller or controllers as required.

The selection component 103 provides methods allowing the user to select preconfigured profiles or templates from the profiles component 101 or the templates component 102 respectively. The user may browse the databases and select entire industrial automation visualization systems including their associated reports and recipes or the user may select subsections of the profiles and/or templates to add to existing visualization systems. For example, the user may only require a new unit operation such as a heat exchanger for energy recovery. The user would add the graphical representation of the heat exchanger to the bottoms exiting the reboiler of a distillation column. If interested, the user could also add the production report associated with the heat exchanger. Including the selection of the heat exchanger profile from the unit operations section of the profiles component 101 database would provide the associated tag names, tag data scan rates and tag data logging rates to complete the automatic configuration of the heat exchanger addition. In another aspect, the user could choose to manual configure all the parameters associated with the heat exchanger.

The user can also create a new industrial automation visualization system by selecting subsets of different sections of the profiles component 101 database and the templates component 102 database and piecing them together to form a new user defined section of the database. For example, the user may select part of a stamping press line, part of a canning line and part of packaging line to create a new user defined production line for creating mashed potatoes for sale by the can and shipped by the pallet.

Figure 2:
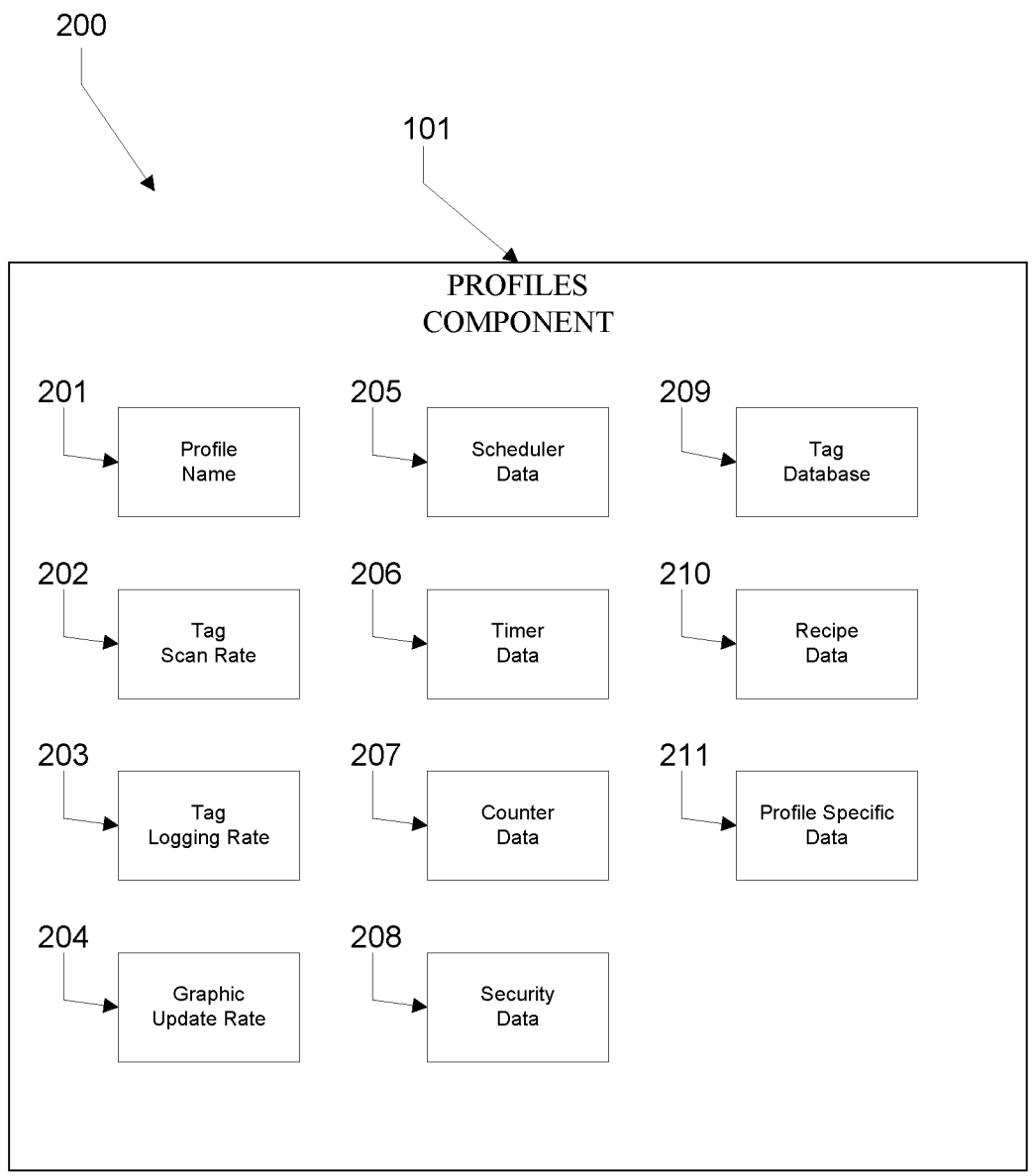
FIG. 2 illustrates an embodiment of a profiles component in relation to the auto-configured sub-components.

Referring to FIG. 2, the profiles component 101 maintains the configuration associated with the industrial automation visualization system segregated by identifiers including but not limited to industry type, production line type, manufacturing process type, machine type and unit operation type. The segregation by the above referenced categories is for user convenience in browsing the selections and does not imply any applicability or limitations. For example, as previously described, the user may select a production line profile in its entirety or the user may select components of interest from one section and add them to components of interest from another section and create a new user defined section. The newly created section may be archived for use in the creation of future industrial automation visualization system applications. The predefined or user created profiles are stored in a format such as but not limited to comma separated variable (CSV), tab separated variable (TSV) or extensible markup language (XML) for simplicity of import into a industrial automation visualization system.

In one aspect of a visualization profile 200, a profile name 201 is provided to identify the visualization profile 200 for the user. For example, a typical profile name 201 might be "Distillation Column" to represent this unit operation type of a distillery or "Capper" to represent the machine type that places the cap on the cough syrup bottle or "Bottling Line" to represent this production line type that fills, caps, labels and packages a soft drink product. The provided profile name 201 in no way implies a limitation as to the use of the profile but may alert the user of particular profile tendencies related to the applicable industry of the profile. An example, as previously described would include the selection of a profile from the pharmaceutical industry type. Governmental regulations require extensive archiving of production data and the user might want to reconfigure the data archiving strategy associated with this profile if the use were intended for a non-regulated area.

In another aspect of a visualization profile 200, a tag database 209 stores all the tags associated with the profile. A tag is a user defined name associated with a unique piece of data collected for at least the purposes of monitoring, controlling or reporting on the industrial process. The tag information includes the required parameters for uniquely addressing the desired data from such locations as one or more industrial controllers of interest, another application running on the same or a communicatively connected computer/industrial controller or data manually input from keyboards, keypads, pushbuttons or other manual devices. A tag may also be derived from other tags either addressed from the devices previously described or similarly derived. The derived tags may perform additional calculations on or linearization of the included data.

A tag scan rate 202 aspect of a visualization profile 200 is maintained for each tag name. The tag scan rate 202 is the frequency at which the tag data is sampled from its place of origin. As previously described, the place of origin may be an industrial controller, a communicatively connected computer or a manual data entry device. The tag scan rate has a default value based on the type of profile to which it belongs. Another aspect of a visualization profile 200 includes a tag logging rate 203 for each tag name. The tag logging rate 203 determines the frequency at which the tag data is archived to a storage device. The tag logging rate 203 also has a default value and is configurable by the user. An additional aspect of a visualization profile 200 includes a graphic update rate 204 for each tag name on each graphic display. The graphic update rate 204 determines the frequency at which the tag name data will be updated on the specified graphic display Like the previous rate parameters, the graphic update rate 204 has a default value based on the profile it resides in and is configurable by the user.

A scheduler data 205 aspect of a visualization profile 200 is maintained to determine when or under what circumstances to initiate defined operations. The defined operations include actions such as but not limited to changing graphic displays, resetting counters and/or timers, generating reports, downloading a new product recipe, backing up archived data to a storage location located on another computer and sending alert notifications. Schedules may be defined by but not limited to an expired amount of time, a clock time of day or a defined event. The defined event may include but is not limited to a tag reaching a specified value, exceeding a specified value, falling below a specified value, varying by more than a specified difference from a specified value, falling inside or outside of a defined range of specified values, etc. For example, scheduler data could be configured to collect production counters at the end of a shift, generate a production report from the production counters, send an alert including the new production report, download a new recipe to change products for the next shift and reset the production counters to zero to track the next shifts production data.

A timer data 206 aspect of a visualization profile 200 is maintained for initializing timer functionality in the industrial controller(s). The timer data 206 includes parameters such as but not limited to the timing period, the unit of timing, the action taken at the end of the time period, and whether or not to restart a new time period upon completion of the previous time period. The unit of timing may range for example from milliseconds to hours, therefore allowing the timing of both very short and very long periods of time. An example of the action to take upon completing the timing would include but not be limited to setting a value in another memory location in the timing industrial controller or another industrial controller or computer communicatively connected to the timing industrial controller.

A counter data 207 aspect of a visualization profile 200 is maintained for initializing counter functionality in the industrial controller(s). The counter data 207 includes parameters such as but not limited to the unit of counting, the maximum value of the count, the action taken when the maximum value of the count is reached and whether or not to restart the count when the previous count is completed. Counters may be cascaded from one to the next to provide for counting to greater maximum values. An example of the action to take upon completing the count would include but not be limited to setting a value in another memory location in the counting industrial controller or another industrial controller or computer communicatively connected to the counting industrial controller.

A security data 208 aspect of a visualization profile 200 is maintained for controlling access to certain data included in the profile or certain functionality or data in the industrial controller(s). The visualization profile 200 has default security based on the industry type of the profile or on the intended use of the data within the industrial controller. For example, set points for the temperature of a reactor vessel would be secured against change without proper credentials because of the danger of losing control of the reaction. Another example as previously described, includes securing the ability to inhibit the logging of tag data in a profile for the pharmaceutical industry because of government regulation of the industry and the requirement of traceability. The enacted security may include but is not limited to providing a password, passphrase or personal identification number to allow access to the desired resource. The security data 208 has default values where included and may be changed by the user at their discretion.

A recipe data 210 aspect of a visualization profile 200 is maintained for configuring industrial controllers with blocks of data values. The recipe data includes a default selection of tag names and associated data values. The user may add or delete tag names to the recipe grouping and/or change the values associated with the included tag names. The recipe may be data values associated with a product changeover, shift changeover, initialization of a new regulatory reporting period, line or unit operation shutdown, etc.

A profile specific data 211 aspect of a visualization profile 200 is maintained for the user to add profile data associated with a user created profile. The subject invention allows the user to select parts of different profiles and piece them together to create an entirely new profile. The user may also add elements to the created profile not found in any of the existing profiles. The profile specific data 211 provides a place for the user to maintain any data required in the newly created profile not available from existing profiles. The user may also add user defined data to a preconfigured automation profile if desired.

Figure 3:
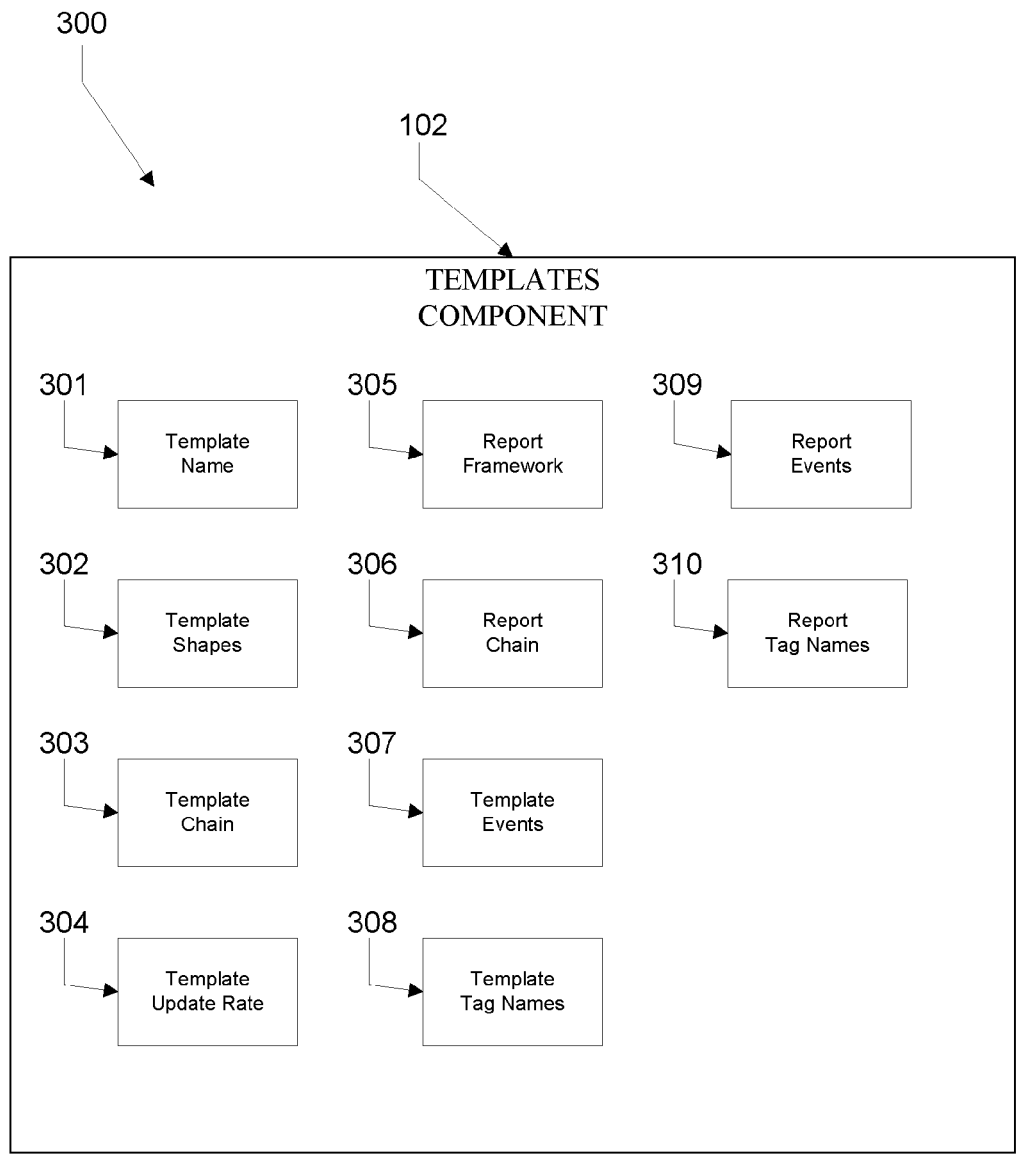
FIG. 3 illustrates an embodiment of a templates component in relation to the auto-configured subcomponents.

Referring to FIG. 3, the templates component 102 maintains the configuration data associated with the industrial automation visualization system segregated by identifiers including but not limited to industry type, production line type, manufacturing process type, machine type and unit operation type. The segregation by the above referenced categories is for user convenience in browsing the selections and does not imply any applicability or limitations. For example, as previously described, the user may select a production line template or report in its entirety or the user may select components of interest from one section and add them to components of interest from another section and create a new user defined section. The newly created section may be archived for use in the creation of future industrial automation visualization system applications. The predefined or user created templates are stored in a format such as but not limited to comma separated variable (CSV), tab separated variable (TSV) or extensible markup language (XML) for simplicity of import into a industrial automation visualization system.

A template name 301 aspect of a visualization template 300 is provided to identify the template or report for the user. For example, a typical template name 301 might be "Catalytic Cracker" to represent this unit operation type of a refinery or "Labler" to represent the machine type that places the labels on the soup can or "Bottling Line Downtime Report" to represent this production line type report that provides information in a formatted report related to the efficiency of the machines that fill, cap, label and package a dishwashing liquid product. The provided template name 301 in no way implies a limitation as to the use of the template but may alert the user of particular template tendencies related to the applicable industry of the profile. An example, as previously described would include the selection of a template from the bottling industry type. Bottling lines run at a high rate of speed and the graphic update rate associated with a template from this industry type might require greater communication network bandwidth.

A template shapes 302 aspect of a visualization template 300 is provided to maintain the background image, individual shapes and functionality making up the graphic image. These shapes may include but are not limited to lines, circles, rectangles, polygons, areas, colors, fills, picture images, video images, overlays, textual letters, textual numbers, user interfaces, etc. in both a static and dynamic format. The template shapes 302 are maintained in an order specified by the designer and a location to display on the graphic image. The shapes may be connected to a tag name from a tag database 209 for the purposes of display or animation or to invoke a user interface to provide data from the industrial automation visualization system to the industrial controller(s). The template shapes 302 may be modified by the user to meet their individual requirements. The user may also select a subset of the totality of the template shapes 302 for use in a user created template. The user created template, in addition to commissioning as an industrial automation visualization system, may be archived for future use in a manner similar to the predefined templates and their associated template shapes 302.

A template chain 303 aspect of a visualization template 300 is provided to maintain the relationship between different templates if applicable. A preconfigured template may be part of a larger group of templates representing for instance a particular machine type, such as "Filler," in a particular production line type, such as a "Canning Line." Information including but not limited to the visualization template 300 representing the previous machine type in the production line type, the next machine type in the production line type, the overview of the production line type of which this machine type is a member or detail visualization templates 300 representing subcomponents of this machine type may be included in the template chain 303 of links associated with this visualization template 300. The template chain 303 may be structured as but not limited to a singly-linked list, doubly-linked list, circularly-linked list, binary tree, hash table, relational database, etc.

A template update rate 304 aspect of a visualization template 300 is provided to maintain the frequency at which the tag names associated with this visualization template 300 should be updated. This parameter overrides the graphic scan rate 204 of the visualization profile 200 and operates on an individual tag basis within the visualization template 300. If the template update rate 304 is not provided then the graphic update rate 204 of the visualization profile acts as the default rate for all tag names associated with the subject visualization template. The user may configure from one to all of the template update rates 304 as required by the user's industrial automation visualization system implementation.

A report framework 305 aspect of a visualization template 300 is provided to maintain informational report formats based on various aspects of the of the industrial automation visualization system. The reports may include but are not limited to production reports, downtime reports, efficiency reports, raw material utilization reports, employee attendance reports, return on capital investment reports, visualization system usage reports, audit reports, emission reports, regulatory reports and the like. The user may modify the report format including changing the data included in the report or adding additional data to the report. Some reports may require presentation of appropriate security credentials to modify or execute the report based on the nature of the data included in the report. Preconfigured reports may include security requirements based on the industry section containing the report. For example, emission reports reflecting compliance or non-compliance with a government regulation may contain security to restrict creation or viewing of the report to authorized individuals. The user may create security requirements for any or all reports. For example, the user may add security to a production report that includes sensitive financial information associated with the product that is the subject of the report.

A report chain 306 aspect of a visualization template 300 is provided to maintain the relationship between different reports if applicable. A preconfigured report may be part of a larger group of reports representing for instance the downtime of a particular machine type, such as "Potato Washer," in a particular production line type, such as a "Bagging Line." Reports including but not limited to the visualization template 300 representing the report on the previous machine type in the production line type, the report on the next machine type in the production line type, the overview report of the production line type of which this machine type is a member or detail visualization templates 300 representing reports on subcomponents of this machine type may be included in the report chain 306 of links associated with this visualization template 300. The report chain 306 may be structured as but not limited to a singly-linked list, doubly-linked list, circularly-linked list, binary tree, hash table, relational database, etc.

A template events 307 aspect of a visualization template 300 is provided to maintain the events and their actions associated with a visualization template 300. Predefined template events 307 may be included in a visualization template 300 to cause the graphic image to change if the circumstances of the defined event are achieved. For example, a particular tag name data value may exceed a defined limit that corresponds to an alarm condition for the tag name data value. As a result of the alarm condition, the industrial automation visualization system may interrogate the visualization template 300 for the identity of the graphic image to display to inform the user of the alarm condition. Upon acknowledging the alarm condition, the visualization template 300 may return to the graphic page displayed before the alarm condition occurred. In another example, the previously described alarm condition may provoke the visualization system to overlay an alarm window on top of the presently displayed visualization template 300 until such time as the alarm condition is acknowledged. After the alarm is acknowledged, the visualization system 300 may remove the alarm window. The user may modify the predefined template events 307 or create new template events 307 for inclusion in the visualization template 300.

A template tag names 308 aspect of a visualization template 300 is provided to maintain the list of tag names associated with the visualization template 300. The template tag names 308 may be for display on the visualization template 300, for use in evaluating template events 307 or for use in sending data from the visualization template 300 to the industrial controller(s). It should be noted that the above referenced uses of the template tag names 308 may be combined in any fashion on one or more visualization templates 300. The template tag names 308 may be structured as but not limited to a singly-linked list, doubly-linked list, circularly-linked list, binary tree, hash table, relational database, etc.

A report events 309 aspect of a visualization template 300 is provided to maintain the events and their actions associated with a visualization template 300 report. Predefined report events 309 may be included in a visualization template 300 to cause the creation and/or transmission of a report if the circumstances of the defined event are achieved. For example, a particular tag name data value may become a value corresponding to the end of a defined reporting period. As a result of the tag name reaching this data value, the industrial automation visualization system 100 may interrogate the visualization template 300 for the identity of the production report to create and transmit to the defined recipients. In another example, the previously described end of shift condition may provoke the industrial automation visualization system 100 to archive a production report to the visualization system 100 data store 701. The user may modify the predefined report events 309 or create new report events 309 for inclusion in the visualization template 300.

A report tag names 310 aspect of a visualization template 300 is provided to maintain the list of tag names associated with the visualization template 300. The report tag names 310 may be for a report in the visualization template 300, for use in evaluating report events 310 or for use in sending data from the visualization template 300 to the industrial controller(s). It should be noted that the above referenced uses of the report tag names 310 may be combined in any fashion on one or more visualization templates 300. The report tag names 310 may be structured as but not limited to a singly-linked list, doubly-linked list, circularly-linked list, binary tree, hash table, relational database, etc.

Figure 4:
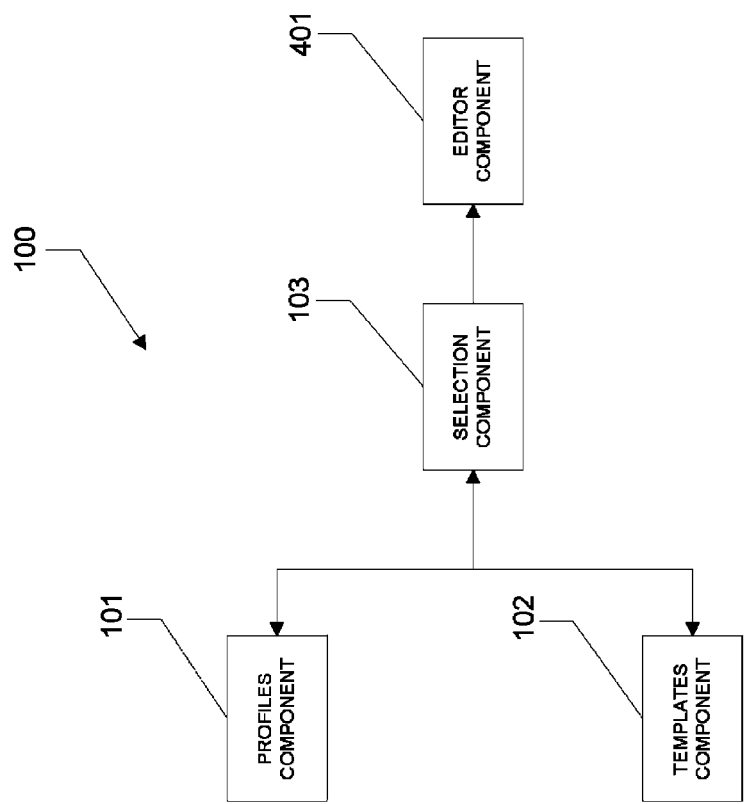
FIG. 4 illustrates an embodiment of a visualization system where an editor component facilitates modifying the provided predefined profile and template component data values.

Referring to FIG. 4, an embodiment of visualization system 100 illustrates an editor component 401 for adding or deleting elements of the preconfigured visualization profile 200 or visualization template 300. The specifics of the user's application of the preconfigured visualization profiles 200 or visualization templates 300 may require the user to modify the elements of the subject invention. For example, the user may desire to use the preconfigured bottling line but the user purchases pre-labeled bottles. Accordingly, the user's bottling line does not include a "Labeler" machine and the user must remove the "Labeler" graphic, "Labeler" production report and all the tag names associated with the labeler machine from the preconfigured visualization profile 200 and visualization template 300 before commissioning the industrial automation visualization system. In another example, the user may have additional automation equipment associated with the subject manufacturing operation and must add this new equipment and all associated tag names to the preconfigured visualization profiles 200 and visualization templates 300 before commissioning the visualization system 100.

Figure 5:
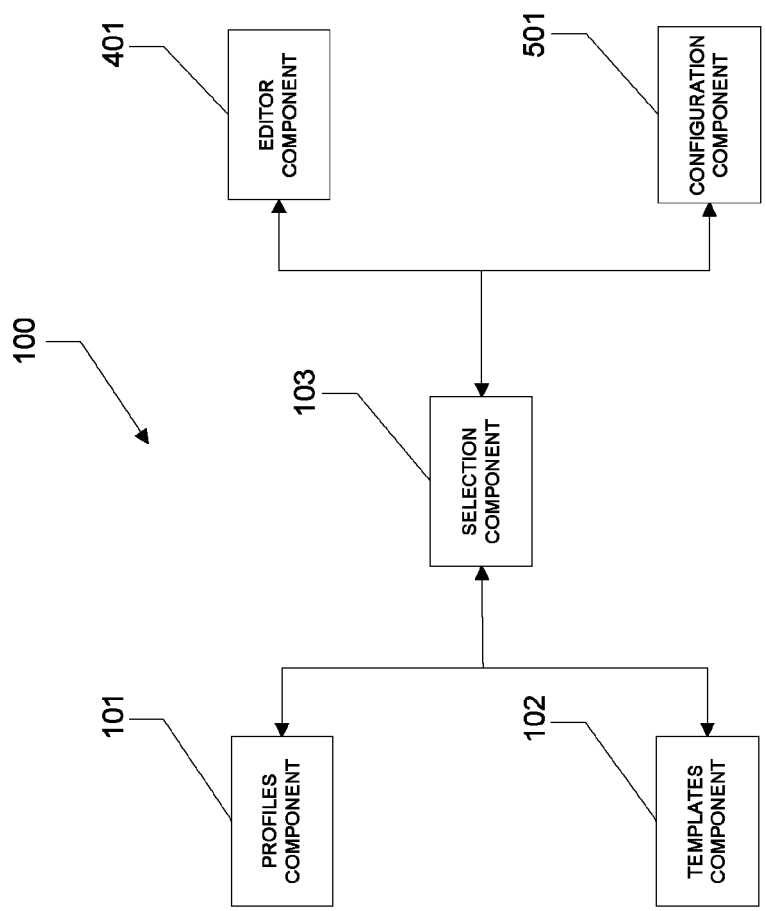
FIG. 5 illustrates an embodiment of a visualization system where a configuration component facilitates adding user application specific configuration to the predefined profile and template component data.

Referring to FIG. 5, an embodiment of visualization system 100 illustrates a configuration component 501 for modifying the elements of the preconfigured visualization profile 200 or visualization template 300. The preconfigured visualization profiles 200 contain parameters including but not limited to tag name, tag name address, tag name scan rate, tag name logging rate, graphic update rate, scheduler time period, scheduler clock time, timer preset value, timer timing increment value, timer action address, counter preset value, counter counting increment, counter action address, recipe name, recipe tag names, recipe tag name values, secured tag names, security access identifiers, profile specific data defined by the user and other visualization profile 200 objects. The user may change the values of these parameters in any combination to suit the needs of the industrial automation visualization system under configuration. The preconfigured visualization templates 300 contain parameters including but not limited to graphic display names, graphic display shapes, shape names, shape colors, shape sizes, shape positions, shape fill colors, shape fill patterns, shape actions, images, image names, image sizes, image positions, image actions, text, text names, text fonts, text sizes, text colors, text positions, text inter-character spacing, text inter-line spacing, text angle, text actions and other visualization template 300 objects. As described above, the user may change the values of these parameters in any combination to suit the needs of the industrial automation visualization system under configuration.

Figure 6:
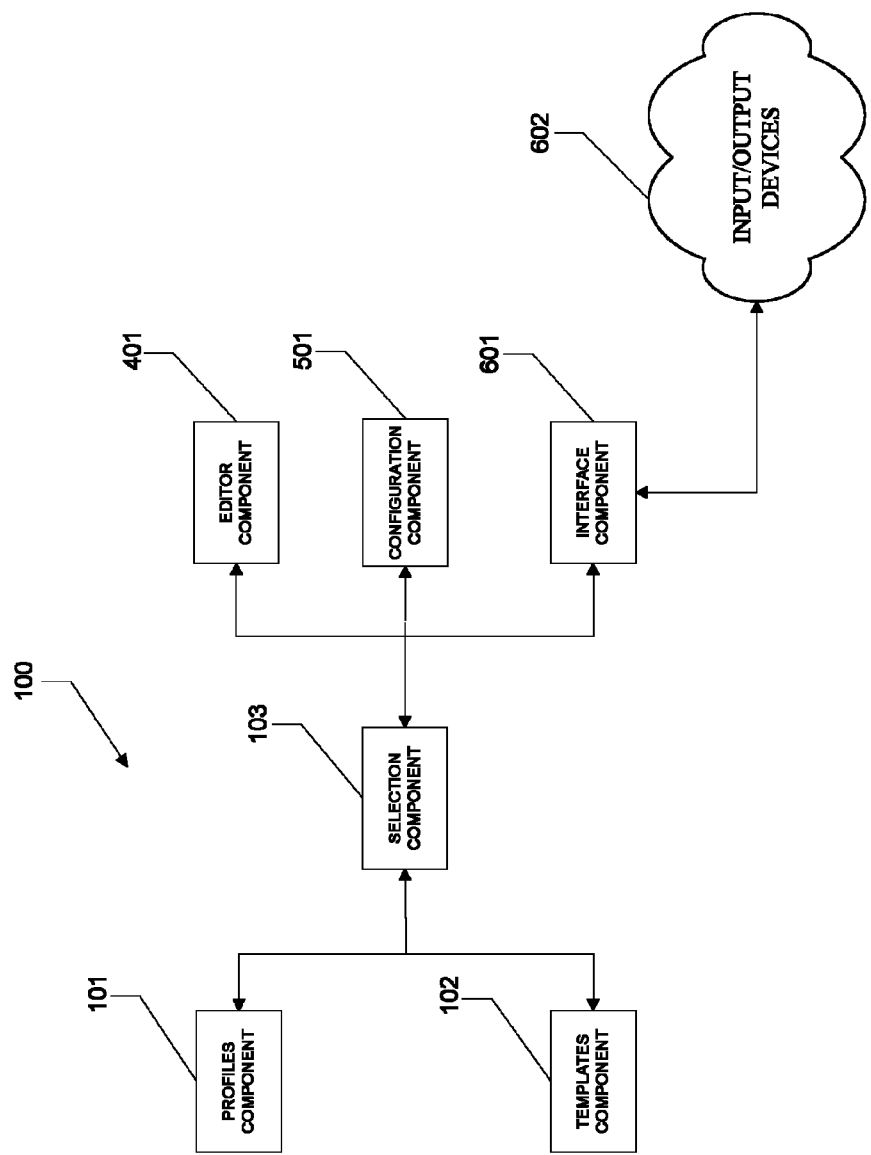
FIG. 6 illustrates an embodiment of a visualization system where an interface component facilitates automatically changing displays, generating reports or downloading recipes based on industrial process data.

Referring to FIG. 6, an embodiment of a visualization system 100 illustrates an interface component 601 communicatively connected to Input/Output devices 602. The interface component 601 provides for object or information selection, input can correspond to entry or modification of data. Such input can affect the configuration, graphic display, reports and/or automation devices. For instance, a user could alter the display format, color, report format, tag name database or the like. Additionally or alternatively, a user could modify automation device parameters. By way of example and not limitation, a conveyor motor speed set point could be increased or decreased. It should be noted that input need not come solely from a user, it can also be provided by automation devices. For example, warnings, alarms, and maintenance schedule information, among other things, can be provided with respect to displayed devices.

The interface component 601 receives input concerning displayed objects and information. Interface component 601 can receive input from a user, where user input can correspond to object identification, selection and/or interaction therewith. Various identification mechanisms can be employed. For example, user input can be based on positioning and/or clicking of a mouse, stylus, or trackball, and/or depression of keys on a keyboard or keypad with respect to displayed information. Furthermore, the display device may be by a touch screen device such that identification can be made based on touching a graphical object. Other input devices are also contemplated including but not limited to gesture detection mechanisms (e.g., pointing, gazing . . . ) and voice recognition.

The interface component 601 may also receive automated input data from the industrial controller which in turn has received input data from the various devices communicatively connected to the industrial controller. Examples of this input data are temperatures, pressures, flow rates, mass, volume, elapsed time counts and other such information available from an industrial process. The interface component 601 may also transmit modified data to the industrial controller(s) to reflect any changes made in the visualization profile 200 or visualization template 300. For example, if the user changed the value of a set point for a PID control loop in a visualization profile 200, the change could be transmitted to the industrial controller implementing this PID control loop. In another example, the interface component 601 may be used to transmit a production report to management personnel located at another computer communicatively coupled to the computer generating the production report.

Figure 7:
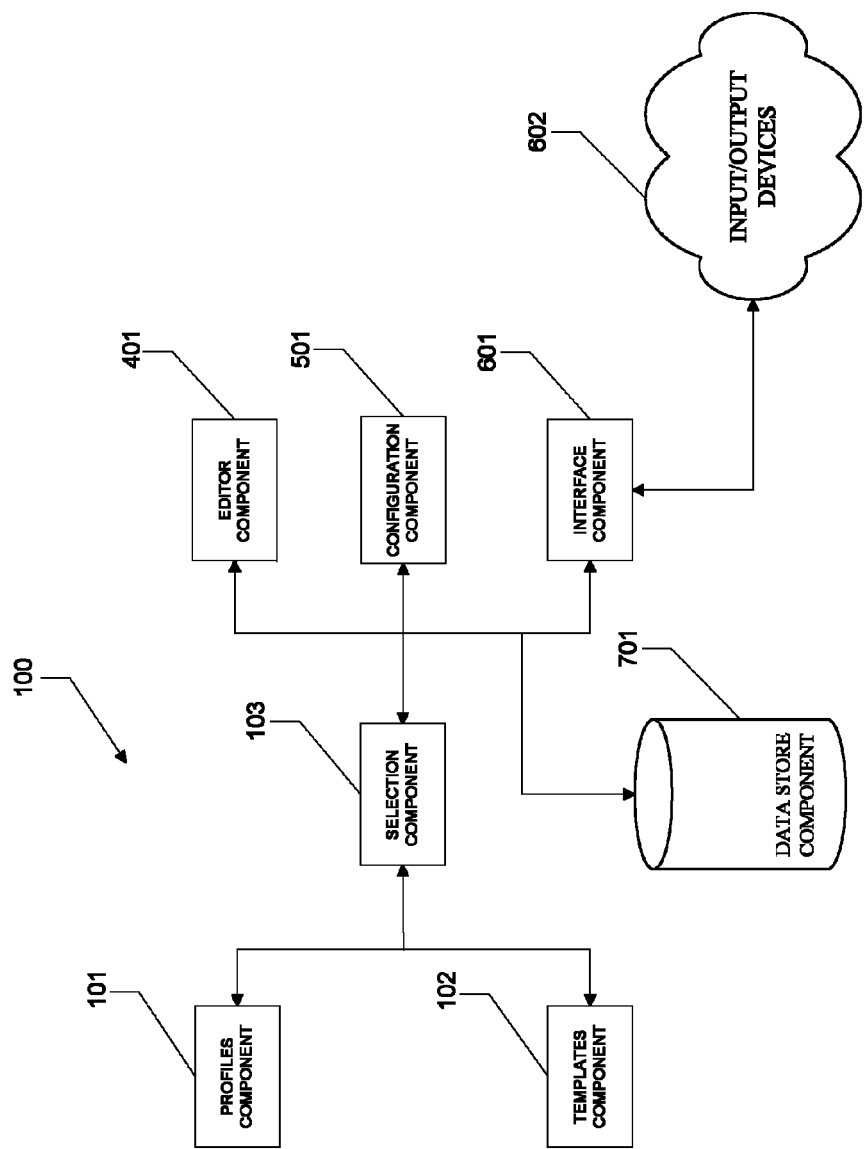
FIG. 7 illustrates an embodiment of a visualization system where a data store component facilitates archiving tag data and modifications or additions to the predefined profiles or templates.

Referring to FIG. 7, an embodiment of visualization system 100 illustrates a data store component 701. Data store component 701 can be any suitable data storage device (e.g., random access memory, read only memory, hard disk, flash memory, optical memory), relational database, XML, media, system, or combination thereof. The data store component 701 can store information, programs, historical process data and the like in connection with the visualization system 100 and the preconfigured visualization profiles 200 and visualization templates 300 described herein. For example, in addition to storing the preconfigured visualization profiles 200 and visualization templates 300, the user may store modified visualization profiles 200 and visualization templates 300 for use in the presently commissioned or for future industrial automation visualization systems without losing the original preconfigured visualization profiles 200 and visualization templates 300.

Data store component 701 archives user created visualization profiles 200 and visualization templates 300. User created visualization profiles 200 are prepared by editor component 401 on this or any other visualization system 100 herein described and stored on data store component 701 for use in the presently commissioned or for future industrial automation visualization systems. Historical data includes archived input data collected from the manual or automatic input devices through interface component 101. Archived input data is maintained by data store component 701 for report generation by any reports defined by any template component 300 report.

Figure 8:
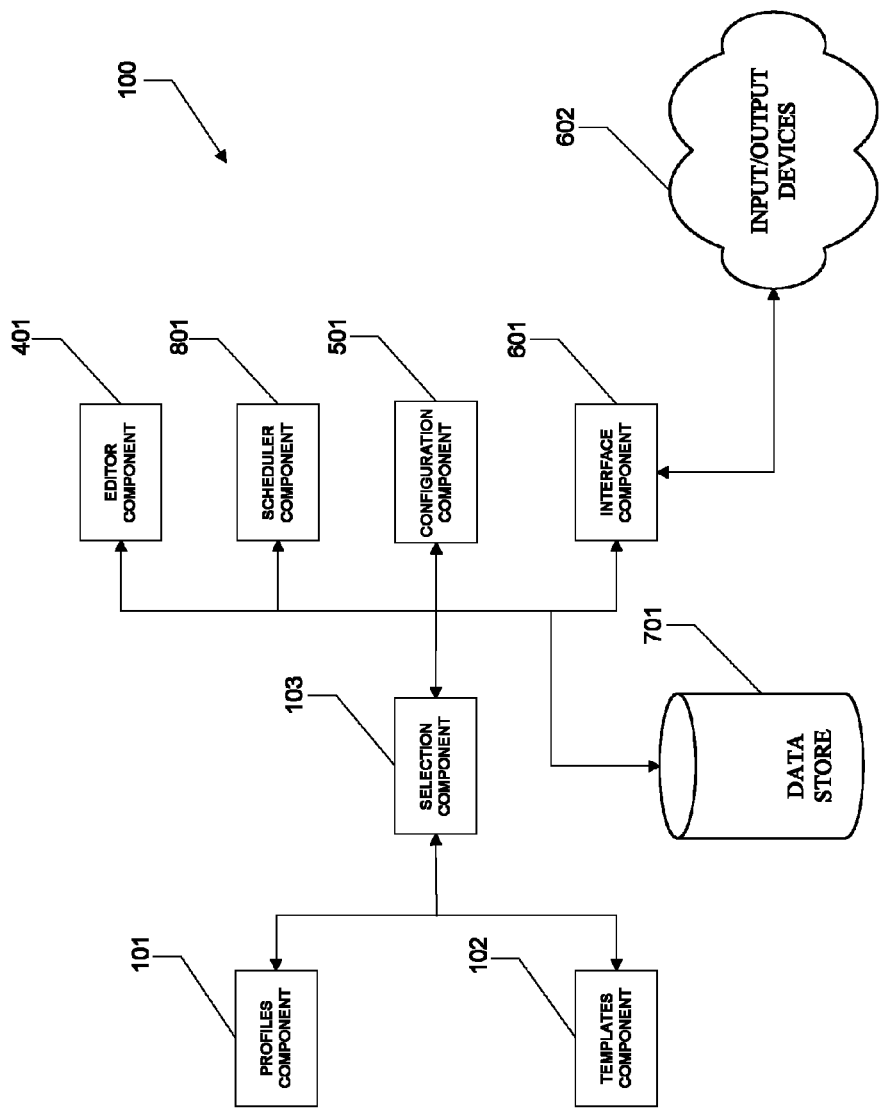
FIG. 8 illustrates an embodiment of a visualization system where a scheduler component facilitates generating predefined reports or changing predefined graphic displays based on clock time.

Referring to FIG. 8, an embodiment of a visualization system 100 illustrates a scheduler component 801. Scheduler component 801 uses the preconfigured or user created event data to determine the appropriate time to perform the action associated with the event. Examples of event actions include but are not limited to changing a graphic page, creating and/or transmitting a report, downloading a recipe to the industrial controller(s), transferring tag name data from the data store component 701 to another computer communicatively connected to the industrial automation visualization system and the like. The scheduler may update the event data or event action based on the operation of the event action.

Figure 9:
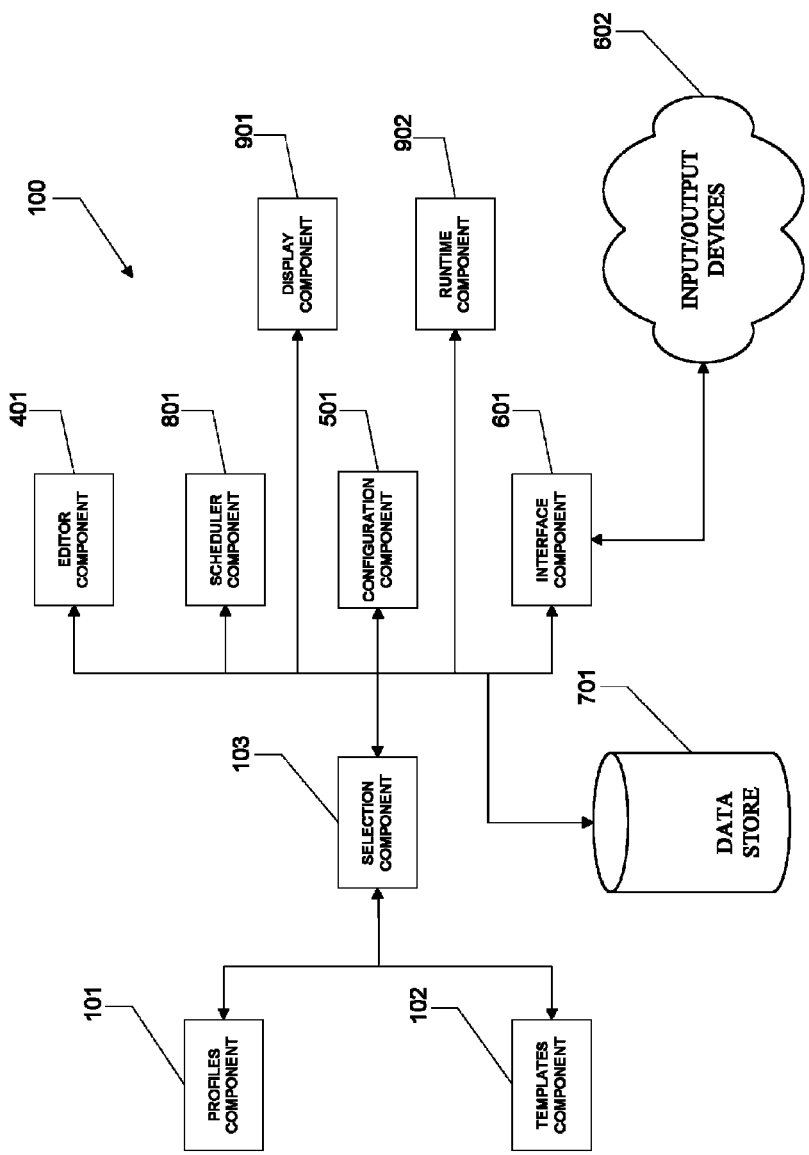
FIG. 9 illustrates an embodiment of a visualization system where a display component and a runtime component facilitate viewing the predefined graphic displays and predefined reports.

Referring to FIG. 9, an embodiment of a visualization system 100 illustrates a display component 901. Display component 901 uses the preconfigured or user created visualization template 300 to display a graphical representation or informational report related to the industrial process. Display component 901 is capable of rendering a display to and/or receiving data from a display device such as a monitor, television, computer, mobile device, web browser or the like. In particular, automation devices and information or data concerning automation devices can be presented using the visualization template 300. The data can be presented with respect to the visualization template 300 as one or more graphics representing the status of the different areas of the process or reports representing summaries, combinations and calculations of tag name data. Furthermore, the tag name data can be static or updated dynamically to provide information in real-time as changes or events occur. Additionally, a user may interact with the visualization system 100 via the interface component 601. The display component 901 can also generate, receive, retrieve or otherwise obtain a graphical representation of a production environment including one or more shapes representing, inter alia, devices, information pertaining to devices (e.g., gages, thermometers . . . ) and the presentation itself.

The shapes can provide information of interest and can correspond to an icon, a thumbnail, a dialog box, a tool tip, and a widget, among other things. The process representations can be transparent, translucent, or opaque be of various sizes, color, brightness, and so forth as well as be animated for example fading in and out. Icon shapes can be utilized to communicate the type of information being presented. Thumbnails can be employed to present an overview of information or essential content. Thumbnails as well as other shapes can be a miniature but legible representation of information being presented and can be static or dynamically updating. Effects such as fade in and out can be used to add or remove superimposed information without overly distracting a user's attention. In addition, shapes can gradually become larger/smaller, brighter/dimmer, more/less opaque or change color or position to attract more or less of a user's attention, thereby indicating increasing or decreasing importance of the information provided thereby. The positions of the shapes can also be used to convey one or more of locations of equipment relative to a user's current location or view, the position or index of a current task within a sequence of tasks, the ability to navigate forward or back to a previously visited presentation or overview and the like. The user can also execute some measure of control over the use/meaning of these various presentation techniques, for example via interface component 601.

If desired, a user can choose, via a variety of selection methods or mechanisms (e.g., clicking, hovering, pointing . . . ), to direct their attention to one or more shapes, detailed graphic displays or reports. In this case the selected information, or shape providing such information, can become prominent within the presentation, allowing the user to view and interact with it in full detail. In some cases, the information may change from static to active/dynamically updating upon selection. When the focus of the presentation changes in such a manner, different information may become more or less interesting or may no longer be of interest at all. Thus, both the graphic display overview and the set of one or more shapes providing interesting information can be updated when a user selects a new graphic display or report.

Runtime component 902 uses the preconfigured or user created visualization profile 200 to sample data from the industrial controller through the interface component 601 and determine what tag data updates or event actions should occur as dictated by the visualization profile 200. Runtime component 902 interrogates the visualization profile 200 and generates the data structures and relationships required to operate the visualization profile 200 and the visualization template 300 as an industrial automation visualization system. Runtime component 902 communicates with display component 901 allowing display component 901 to instruct runtime component 902 on which tag names are required for the currently displayed graphic image. If configured as such, display component 901 can instruct runtime component 902 on template update rate 304 for template tag names 308 associated with the currently displayed graphic image. Additionally, display component 901 can communicate template events 307, report tag names 310 and report events 309 to runtime component 902 so runtime component 902 can monitor the reported tag names and act on the reported events.

Runtime component 902 can generate an industrial automation visualization system readable binary image of the preconfigured visualization system allowing the preconfigured visualization system to be transported to other devices for commissioning. The preconfigured image may be communicatively transported from one device to another across a network or it may be transferred to another media such as but not limited to a CD or flash drive for transport to the commissioning device.

Figure 10:
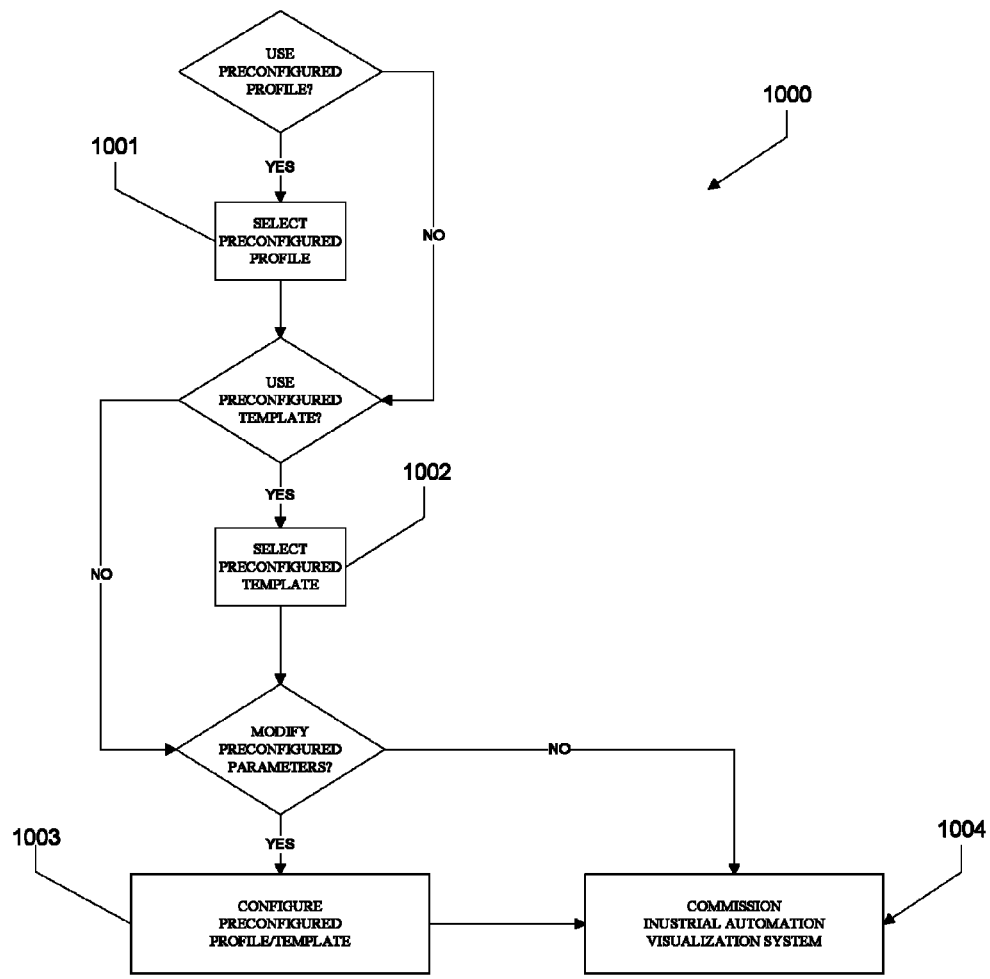
FIG. 10 illustrates a methodology of configuring a visualization system with predefined visualization profiles and predefined visualization templates.

FIG. 10 illustrates a methodology 1000 for creating and displaying an industrial automation visualization system. The user first decides if they will use a preconfigured visualization profile 200 in the industrial automation visualization system implementation. If the user decides to use a preconfigured visualization profile 200 then at 1001 the user selects the desired visualization profile 200 with selection component 103. The user may choose to modify parameters of the visualization profile 200 with configuration component 501 or to add elements to or delete elements from the visualization profile 200 with the editor component 401. Next the user decides if they will use a preconfigured visualization template 200 in the industrial automation visualization system implementation. If the user decides to use a preconfigured visualization template 200 then at 1002 the user selects the desired visualization template 300 with selection component 103. The user may choose to modify parameters of the visualization template 300 with configuration component 501 or to add elements to or delete elements from the visualization profile 200 with the editor component 401. The user then commissions the industrial automation visualization system.

While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

What is claimed is:
1. A system, comprising:
a processor, communicatively coupled to a memory that stores computer-executable components, that executes or facilitates execution of the computer-executable components, comprising:
a runtime component configured to generate an industrial automation visualization from at least one of a preconfigured visualization profile or a preconfigured visualization template and
a display component configured to:
interrogate the at least one of the preconfigured visualization profile or the preconfigured visualization template to determine a graphic update rate for a tag name of the industrial automation visualization, wherein in response to the presence of the preconfigured visualization template having a first graphic update rate for the tag name that takes precedence over a second graphic update rate for the tag name in the preconfigured visualization profile, select the first graphic update rate as the graphic update rate for the tag name, and in response to the preconfigured visualization template not being present, select the second graphic update rate as the graphic update rate for the tag name; and instruct the runtime component to employ the determined graphic update rate.

2. The system of claim 1, further comprising a configuration component configured to enable modification of elements of at least one of the preconfigured visualization profile or the preconfigured visualization template, wherein the configuration component is further configured to prevent modification of an element specified as non-modifiable.

3. The system of claim 2, wherein the elements of the preconfigured visualization profile that can be modified comprise at least one of:
- a rate to archive tag data to a data store; or
- a rate to update a graphic display with tag data.

4. The system of claim 1, wherein the runtime component is further configured to send timer data to an industrial controller by interrogating the preconfigured visualization profile for timer data, wherein the timer data comprises:
- a timer preset value for defining a timing period;
- a timer address for determining the timer's location in the industrial controller; and
- a timer action for facilitating notification of timer completion.

5. The system of claim 1, wherein the runtime component is further configured to send counter data to an industrial controller by interrogating the preconfigured visualization profile for counter data, wherein the counter data comprises:
- a counter preset value for defining a counting limit;
- a counter address for determining the counter's location in the industrial controller; and
- a counter action for facilitating notification of counter completion.

6. The system of claim 1, wherein runtime component is further configured to request tag data from an industrial controller by interrogating a preconfigured visualization profile tag database comprising at least one tag, wherein the at least one tag comprises:
- an address in the industrial controller;
- a tag name representing the address in the industrial controller; and
- a type of tag data represented at the address in the industrial controller.

7. The system of claim 1, wherein the display component is further configured to display a graphic image by interrogating the preconfigured visualization template for a list of template shapes respectively comprising:
- a shape color;
- a shape value; and
- a shape fill.

8. The system of claim 1, wherein the display component is further configured to navigate a list of preconfigured visualization templates associated with each other based on at least one of industry type, production line type, and unit operation type by interrogating a template chain list included within the preconfigured visualization template.

9. The system of claim 1, wherein the display component is further configured to generate a list of preconfigured reports associated with each other based on at least one of industry type, production line type, and unit operation type by interrogating a report chain list included within the preconfigured visualization template.

10. A method, comprising:
generating, by a system including a processor, an industrial automation visualization from at least one of a preconfigured visualization profile or a preconfigured visualization template and
examine, by the system, the at least one of the preconfigured visualization profile or the preconfigured visualization template to determine a graphic update rate for a tag name of the industrial automation visualization, wherein in response to the presence of the preconfigured visualization template having a first graphic update rate for the tag name that takes precedence over a second graphic update rate for the tag name in the preconfigured visualization profile, selecting the first graphic update rate as the graphic update rate for the tag name, and in response to the preconfigured visualization template not being present, selecting the second graphic update rate as the graphic update rate for the tag name; and
employing, by the system, the determined graphic update rate.

11. The method of claim 10, further comprising enabling, by the system, modification of elements of at least one of the preconfigured visualization profile or the preconfigured visualization template, and preventing, by the system, modification of an element specified as non-modifiable.

12. The method of claim 11, wherein the elements of the preconfigured visualization profile that can be modified comprise at least one of:
- a rate to archive tag data to a data store; or
- a rate to update a graphic display with tag data.

13. The method of claim 10, further comprising sending, by the system, timer data to an industrial controller by interrogating the preconfigured visualization profile for timer data, wherein the timer data comprises:
- a timer preset value for defining a timing period;
- a timer address for determining the timer's location in the industrial controller; and
- a timer action for facilitating notification of timer completion.

14. The method of claim 10, further comprising sending, by the system, counter data to an industrial controller by interrogating the preconfigured visualization profile for counter data, wherein the counter data comprises:
- a counter preset value for defining a counting limit;
- a counter address for determining the counter's location in the industrial controller; and
- a counter action for facilitating notification of counter completion.

15. The method of claim 10, further comprising requesting, by the system, tag data from an industrial controller by interrogating a preconfigured visualization profile tag database comprising at least one tag, wherein the at least one tag comprises:
- an address in the industrial controller;
- a tag name representing the address in the industrial controller; and
- a type of tag data represented at the address in the industrial controller.

16. The method of claim 10, further comprising navigating, by the system, a list of preconfigured visualization templates associated with each other based on at least one of industry type, production line type, and unit operation type by interrogating a template chain list included within the preconfigured visualization template.

17. The method of claim 10, further comprising navigating, by the system, generate a list of preconfigured reports associated with each other based on at least one of industry type, production line type, and unit operation type by interrogating a report chain list included within the preconfigured visualization template.

18. A non-transitory computer-readable medium having instructions stored thereon that, in response to execution, cause a system including a processor to perform operations comprising:

generating an industrial automation visualization from at least one of a preconfigured visualization profile or a preconfigured visualization template and inspecting the at least one of the preconfigured visualization profile or the preconfigured visualization template to determine a graphic update rate for a tag name of the industrial automation visualization, wherein in response to the presence of the preconfigured visualization template having a first graphic update rate for the tag name that takes precedence over a second graphic update rate for the tag name in the preconfigured visualization profile, selecting the first graphic update rate as the graphic update rate for the tag name, and in response to the preconfigured visualization template not being present, selecting the second graphic update rate as the graphic update rate for the tag name; and employing the determined graphic update rate.

19. The non-transitory computer-readable medium of claim 18, the operations further comprising enabling modification of elements of at least one of the preconfigured visualization profile or the preconfigured visualization template, and preventing, by the system, modification of an element specified as non-modifiable.

20. The non-transitory computer-readable medium of claim 19, wherein the elements of the preconfigured visualization profile that can be modified comprise at least one of:

a rate to archive tag data to a data store; or a rate to update a graphic display with tag data.

* * * * *